Figure 1:
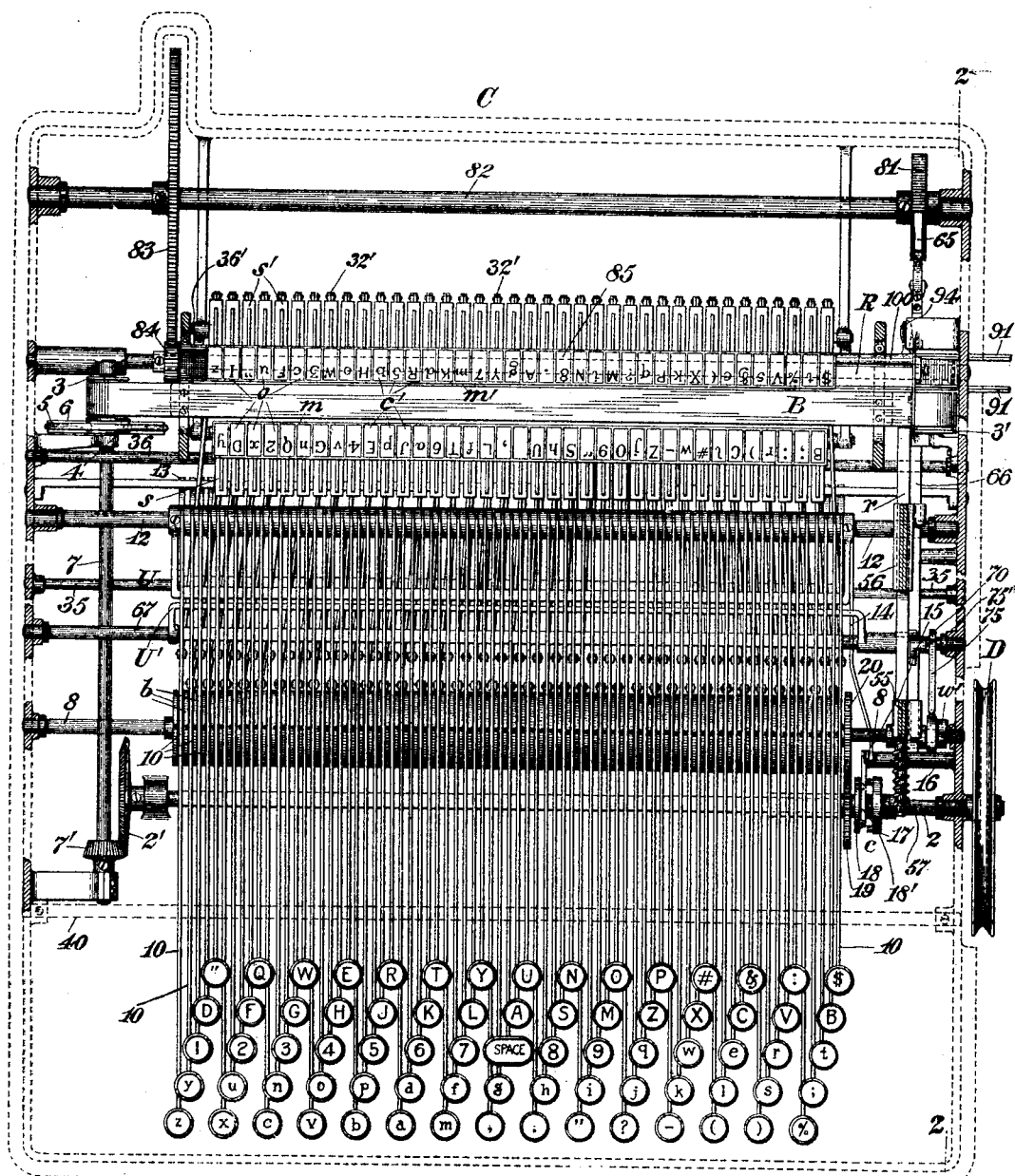

No. 638,275. Patented Dec. 5, 1899.
F. H. RICHARDS.
CARD SETTING MECHANISM.
(Application filed Aug. 26, 1898.)

(No Model.) 8 Sheets—Sheet 1.

No. 638,275. Patented Dec. 5, 1899.
F. H. RICHARDS.
CARD SETTING MECHANISM.
(Application filed Aug. 26, 1898.)

(No Model.) 8 Sheets—Sheet 2.

Witnesses:

Inventor:

No. 638,275. Patented Dec. 5, 1899.
F. H. RICHARDS.
CARD SETTING MECHANISM.
(Application filed Aug. 26, 1898.)

(No Model.) 8 Sheets—Sheet 3.

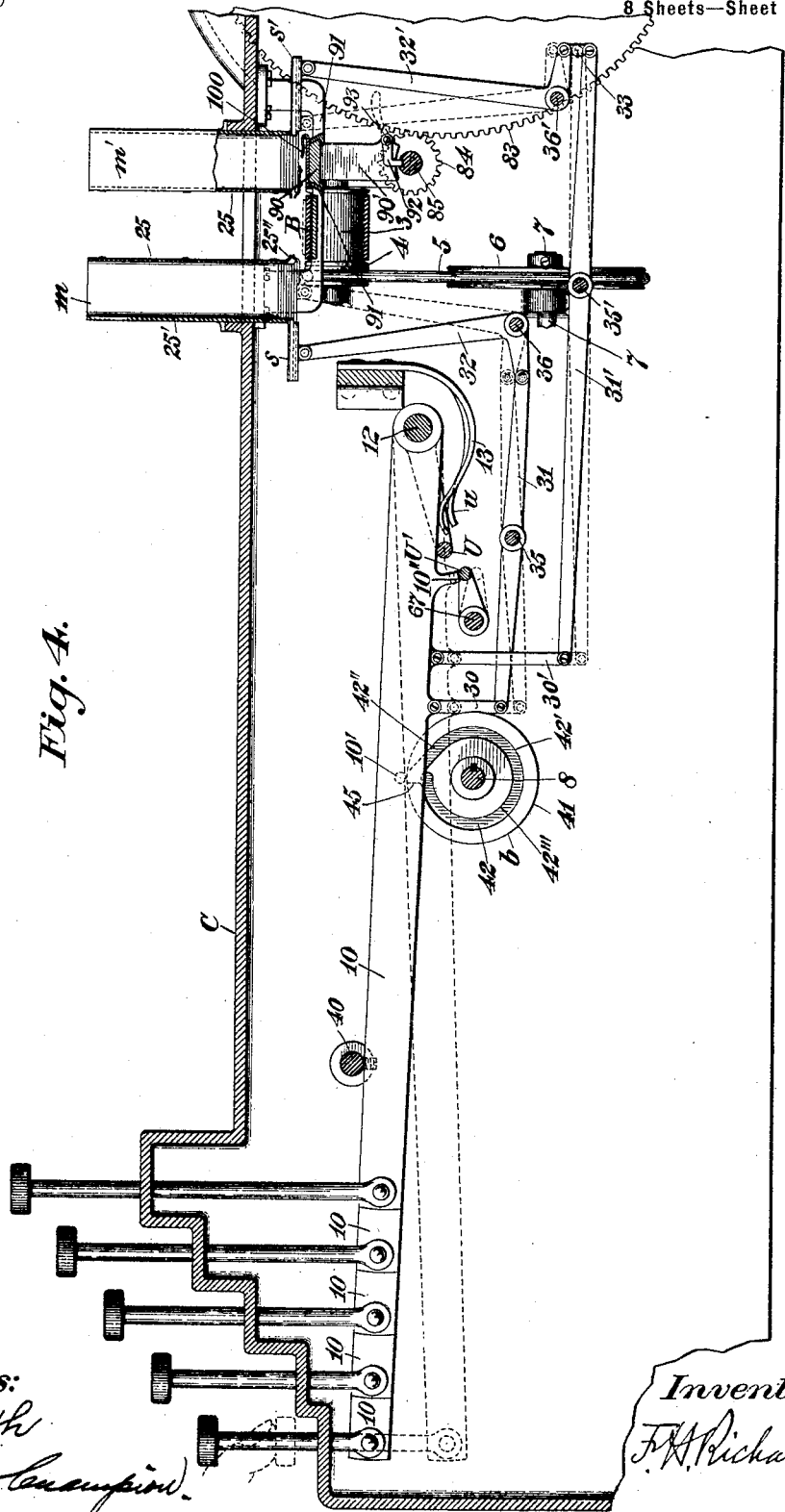

No. 638,275. Patented Dec. 5, 1899.
F. H. RICHARDS.
CARD SETTING MECHANISM.
(Application filed Aug. 26, 1898.)
(No Model.) 8 Sheets—Sheet 5.
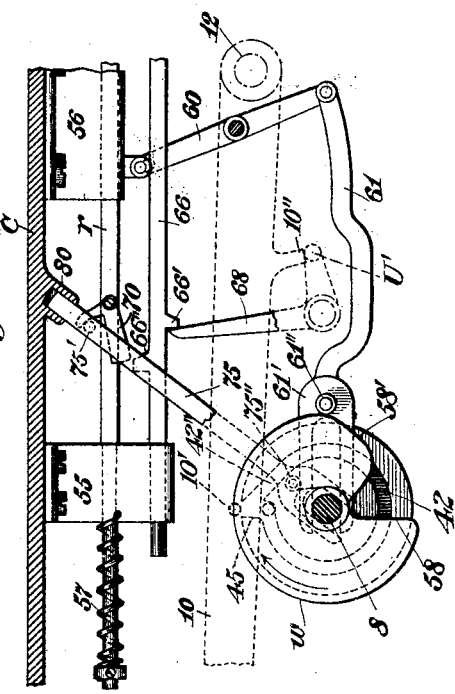
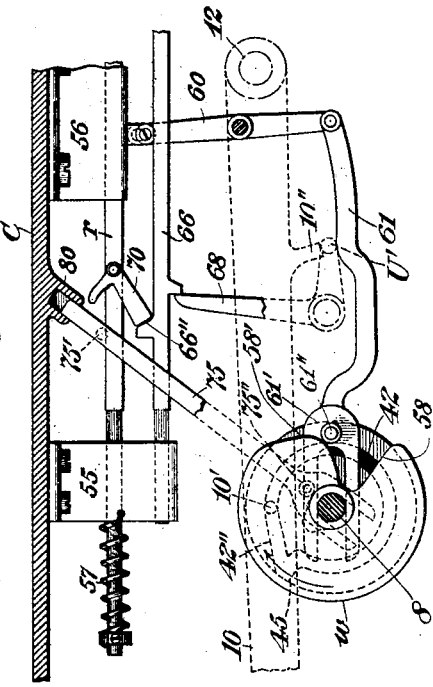
Witnesses;
Inventor:
F. H. Richards.

No. 638,275. Patented Dec. 5, 1899.
F. H. RICHARDS.
CARD SETTING MECHANISM.
(Application filed Aug. 26, 1898.)
(No Model.) 8 Sheets—Sheet 6.
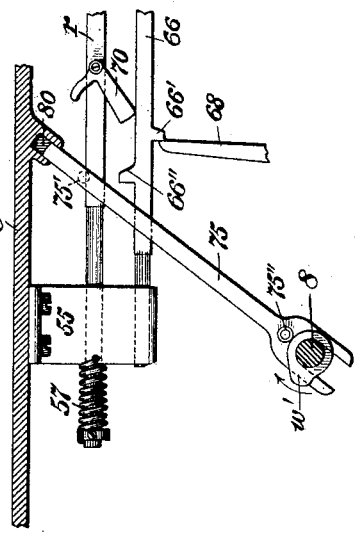
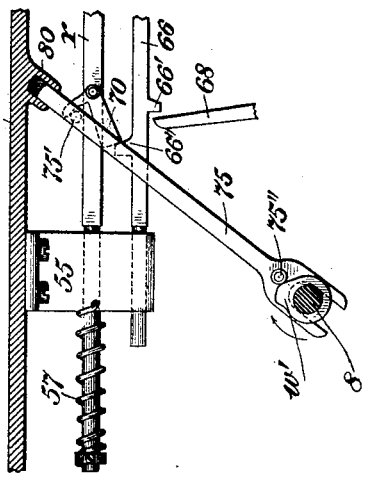
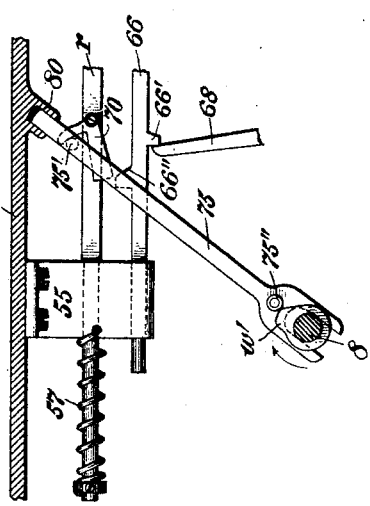
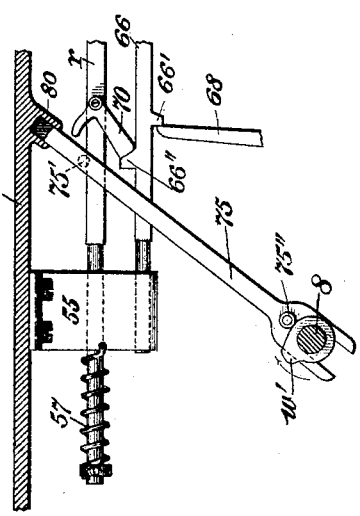
Witnesses:
O. W. Smith
Inventor:
F. H. Richards.

No. 638,275. Patented Dec. 5, 1899.
F. H. RICHARDS.
CARD SETTING MECHANISM.
(Application filed Aug. 26, 1898.)
(No Model.) 8 Sheets—Sheet 7.
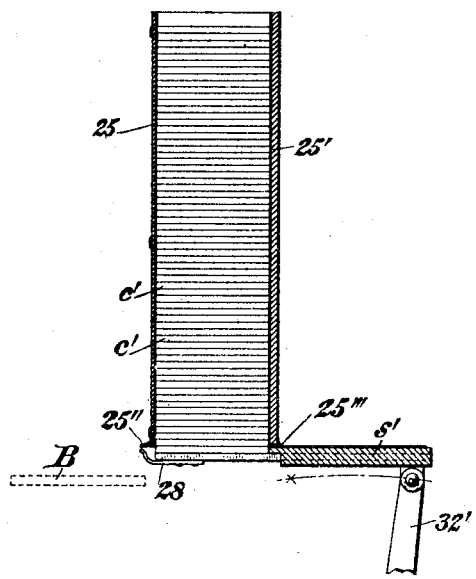
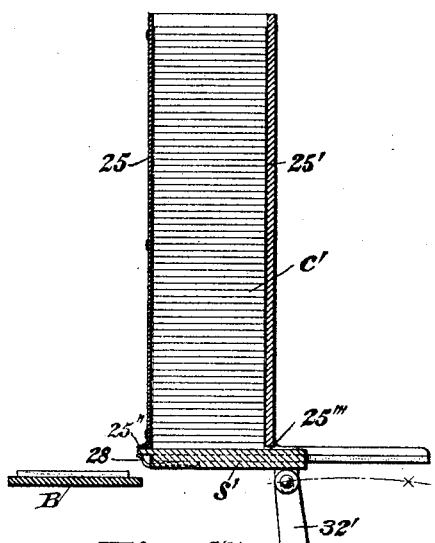
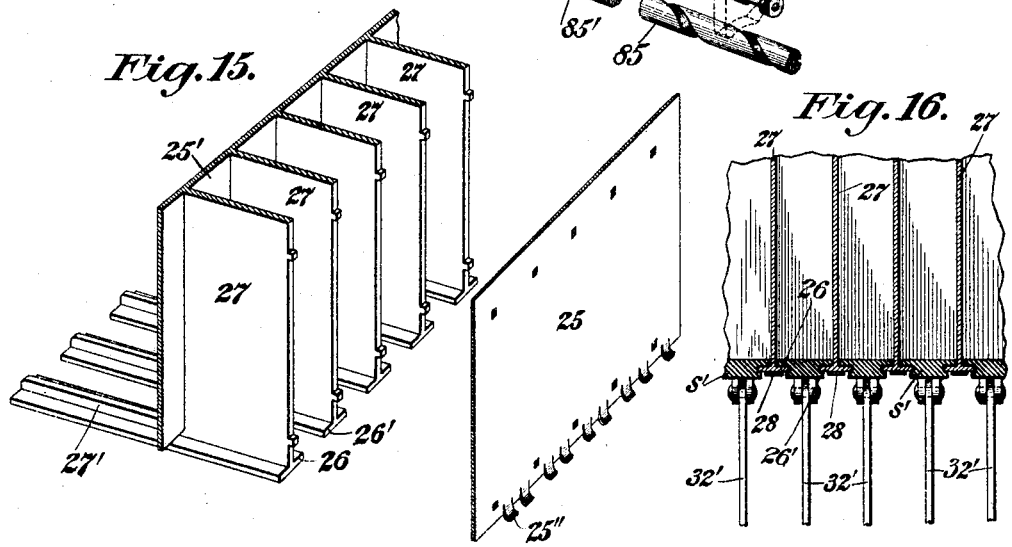
Witnesses:
Inventor:
F. H. Richards No. 638,275. Patented Dec. 5, 1899.
F. H. RICHARDS.
CARD SETTING MECHANISM.
(Application filed Aug. 26, 1898.)
(No Model.) 8 Sheets—Sheet 8.

Witnesses:
C. W. Smith
E. E. Champion

Inventor:
F. H. Richards

THE NORRIS PETERS CO., PHOTO-LITHO., WASHINGTON, D. C.

UNITED STATES PATENT OFFICE.

FRANCIS H. RICHARDS, OF HARTFORD, CONNECTICUT.

CARD-SETTING MECHANISM.

SPECIFICATION forming part of Letters Patent No. 638,275, dated December 5, 1899.

Application filed August 26, 1898. Serial No. 689,564. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Card-Setting Mechanism, of which the following is a specification.

This invention relates to card-setting mechanism; and it has for its main object the provision of a machine by means of which cards bearing suitable devices or characters may be assembled selectively in any desired order to form a series or group of cards bearing a corresponding series or group of characters or devices, which may be reproduced afterward by photography in any suitable manner—as, for example, that described in the application of John T. Bentley, filed October 1, 1898, Serial No. 692,420, to which I have permission to refer.

My present invention relates solely to a mechanism, usually key-operated, for setting up cards in the desired order, and hence in this case I have not shown, nor will there be described, any mechanism for photographing or otherwise using or disposing of the cards after they have been set up by the machine.

I have termed this machine a "card-setting" mechanism, for the reason that it is intended to set up cards having suitable devices or characters printed or otherwise displayed thereon; but as these cards might be of any proper material and of many different dimensions it should be understood that the term "card" is intended to include within its meaning any thin substantially sheet-like object on which such character may be displayed.

In the art of mechanical composition as heretofore practiced many methods have been employed for selectively setting up by machinery type matter or its equivalent to be printed afterward either directly from the type, linotypes, or other devices set up by the machine or from stereotype or similar plates formed from such set-up matter. In the present case the card-setting mechanism is intended to set up selectively cards, which when assembled may have their characters reproduced either in groups of lines or by columns or pages by any suitable method known to photoprinting.

As the function of my present machine is simply to set up the cards in proper groups or lines, the essential features of a mechanism suitable for this purpose will now be described.

As the different characters should be carried by different cards and as there should be a sufficient number of each one of these characters for practical composition by the mechanism, it is essential that the machine should embody as one of its principal features a plurality of magazines corresponding, respectively, to the several different cards or objects on which the individual characters or devices should be displayed in such a manner as to be capable of reproduction by the photographic or photoprinting process to which they may be subjected. These card-magazines may be disposed in any suitable positions with respect to the remainder of the mechanism; but in order to obtain a compact organization of the several operative devices I prefer to locate these magazines in two rows crosswise of the machine, and thus reduce the width of the frame.

The magazines used may be of any suitable type and construction so long as they are capable of containing a large number of cards and of permitting these cards to be delivered readily therefrom when the selecting mechanism therefor is operated. Usually, of course, the selecting means will be key-operated, and the keys may be arranged in any desired order to form a keyboard similar to that of a type-writing or type-setting machine. Each of the cards, after it has been selected by its respective card-selecting or object-selecting means, will be carried on suitable transferring means to a card-assembling receiver or composing-stick, in which the several selected cards will be arranged in proper order, one after another, as they are selected from the magazines by the manipulation of the keys of the keyboard.

The transferring means for the objects or cards will be movable ordinarily, and I prefer to make use of a card-transferring belt coöperative with the row or rows of magazines in such a manner as to travel in a path close to all of said magazines and sufficiently near to receive any selected card and transfer it to the card-assembling receiver. This belt may travel continuously in order that the cards may be transmitted to the composing-point as rapidly as they may be selected by the manipulation of the keys. Ordinarily a card-shifting or object-shifting device will coöperate with the transfer-belt to push the cards off from the latter and onto the receiver at a determined point in the movement of said belt, which point will be determined generally by a stop against which the cards may strike successively, the shifting of the cards off from the belt being effected, preferably, by a movement of the shifting device transverse to the path of movement of the belt.

When the objects or cards are shifted off from the transfer-belt in the manner just described, it is of course necessary to shift the object-assembling receiver in order to prevent superimposition of the selected objects. Hence one of the most important features of this card-setting mechanism is the employment, in connection with object-magazines, object-selecting means, and object-transferring means, of an object-assembling receiver or composing-stick movable to different object-receiving positions, the movements of this receiver being controlled by suitable receiver-feeding means. As the cards will be selected one at a time by the selective actuation of single keys it will be found most advantageous to feed the receiver by a step-by-step movement, one step on each actuation of a key.

The several characters or devices carried by the cards to be set up will be usually the ordinary letters, numbers, and other symbols ordinarily employed in type composition, and, as it is well known, these characters vary greatly in width, and hence in the amount of space occupied by them when set up in lines of composed matter. As it is desirable and, indeed, at the present time essential to allot to each character a space in the line of composed matter corresponding to its width, it becomes necessary to employ receiver-feeding means or feed mechanism by means of which the receiver or composing-stick may be fed different distances, which distances of course correspond to the respective characters selected by the actuation of the keys. Hence another important feature of this invention is the employment, in connection with the magazines and the selecting means, of variable feed mechanism, the feed movements of which correspond to those required for different characters, each different feed movement of this mechanism being controlled, of course, by the proper key, corresponding to the character for which that particular feed movement is required.

In order to relieve the operator of the major portion of the work of assembling the cards, the mechanism forming the subject-matter of this invention is semi-automatic in operation, and especially is this the case with the variable feed mechanism just described. This mechanism is intended to be set by the depression of a selected key, and after it has been set suitable power-operated actuating means depending upon the actuation of such key will operate the feed mechanism to impart thereto a movement corresponding to the width of the character controlled by such key. Ordinarily it will be found advantageous to employ a pawl-and-ratchet mechanism controlled by the actuation of the keys, the pawl having variable lengths of throw corresponding to the respective keys depressed, and the ratchet-wheel may operate a feed-screw coöperative with the movable receiver or composing-stick, into which the cards are projected by the object-shifting device.

The cards contained in the magazines may be held therein and ejected therefrom in any suitable manner; but I prefer to employ magazines in which the cards are superimposed and fed by gravity toward the lower ends or mouths of the magazines, from which the underneath cards of the respective piles may be separated, selectively, by suitable card-ejecting members, which of course will be controlled by the keys and will, in fact, form part of the object-selecting means. These card-ejectors are preferably slides movable transversely to the magazines, and in the preferred construction they will traverse the magazines transversely and be guided at the bottom of each magazine by the same ribs that support the pile of cards therein. Each card-ejecting slide should of course be of such thickness as to remove only one card at a time from a magazine, and this card should be so delivered as to fall flatwise onto the transfer-belt adjacent to the mouth of the magazine. Obviously unless the card does fall in this manner it is liable to be turned partly around and delivered improperly to the receiver, and this improper delivery will of course be likely to spoil the whole line of cards assembled in the composing-stick. In order to prevent such improper delivery of the cards, I prefer to employ at the discharge end of each magazine one or more card-guides of such construction as to hold an ejected card in a plane substantially parallel with the receiving-run of the belt until the card is released. When released, and while in this parallel position, the card will of course fall straight and be received properly by the belt, it being understood, of course, that the cards will be of sufficient weight to prevent disarrangement thereof by the ordinary air-currents. Usually I will employ two opposed card-guides at each magazine, between which guides the extreme rear end of an ejected card will be held firmly and the card maintained in its proper position until it passes beyond said guides. At least one of these guides should be a yielding one in order to insure a proper, but not too firm, hold upon a card during the delivery of the latter.

In a key-operated mechanism of this type it is necessary to prevent interference with the predetermined sequence of operations which should follow the actuation of any particular selected key, and for this reason it is desirable to make use of suitable blocking devices for preventing a too-rapid manipulation of the keys of the keyboard, some of which the operator may finger with greater facility than others. One of the main features of my present invention is the blocking mechanism for preventing this excessively-rapid striking of the keys; but it should be understood that any suitable key-blocking means controlled by the actuation of the respective keys may be employed in connection with the object-magazines, the object-ejectors, the transferring means, and the receiver, hereinbefore mentioned. The particular blocking mechanism employed herein, however, is in the nature of rotary key-blocking means controlled by the actuation of the respective keys of the keyboard, which keys in turn govern the movements of a suitably-operated mechanism. Usually this key-blocking means will be intermittently rotated, it being controlled in the present case by key-operated coupling means, by which the blocking means may be connected intermittently with a continuously-rotative driver. In the preferred construction this rotary key-blocking device has concentric blocking-faces, which are alternately effective, the one to prevent the return of an actuated key until the proper time and the other to prevent the actuation of any of the other keys until the operated key shall have returned to its normal position. In the present case each blocking device will usually coöperate with a corresponding key, the periphery of the blocking device serving to prevent actuation of that key when another key is operated, while a blocking-groove in the side face of the blocking-disk will prevent premature return of its own key after the latter has been operated. While the blocking-faces of each key-blocking device are alternately effective, all of said blocking devices will ordinarily rotate simultaneously and be disposed in corresponding positions relatively to a common axis of rotation. When a key is operated, all of these simultaneously-rotative blocking devices will be instantaneously coupled to the continuously-rotative driver, and they should make one complete rotation, at the end of which the movement of the blocking devices should be stopped, and they should be left in position to coöperate properly with the next key depressed. For this reason I deem it desirable to make use of each actuated key as a means for stopping the rotation of the blocking devices, as well as for controlling the starting of said rotation. In this case each key constitutes a rotation-stopping device, against which a stop-face on the corresponding blocking device may engage at the end of each complete rotation of the latter, and this key-striking stop-face will usually be disposed between and connect the alternately-effective blocking-faces of the rotary key-blocking device, it being illustrated in the drawings of this application as a substantially radial stop-face connecting the outer wall of the blocking-groove in a disk with the periphery of such disk. Usually the rotation-stopping member of the key will be a pin which will work in this groove and be in engagement with the outer wall thereof, the latter preventing the rising of the key until the pin reaches an opening in the blocking-groove communicating with the periphery of the disk, whereupon, of course, the key may be raised by the usual spring, and in rising will carry the pin into position to be struck by the stop-face of the disk and to check the rotation of the blocking means.

All of these features of my present invention and many others which have not been described hereinbefore in detail, but which will be set forth fully hereinafter, are shown in the drawings accompanying and forming part of this specification, in which—

Figure 2:
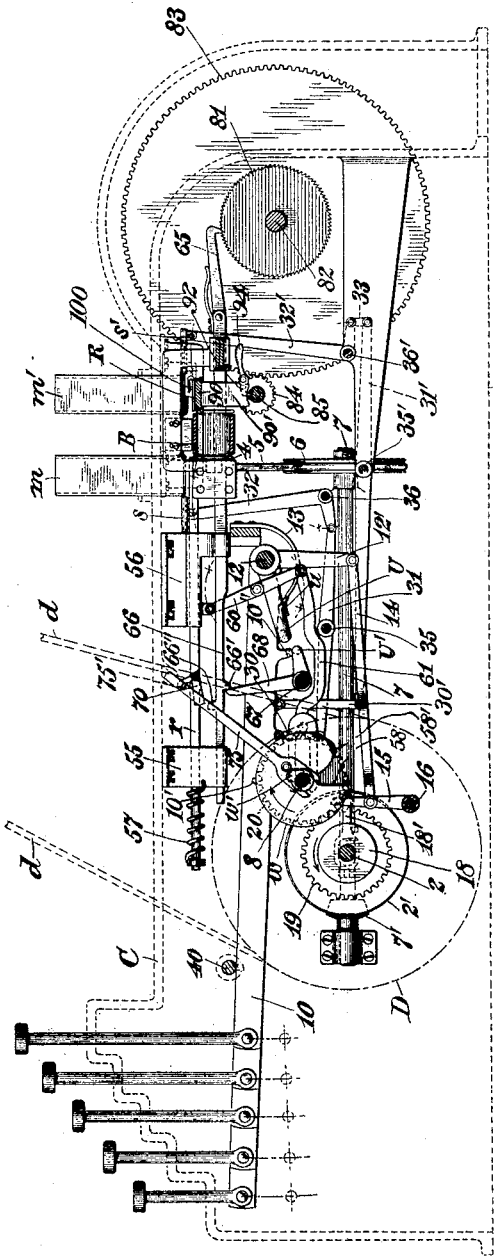
Figure 3:
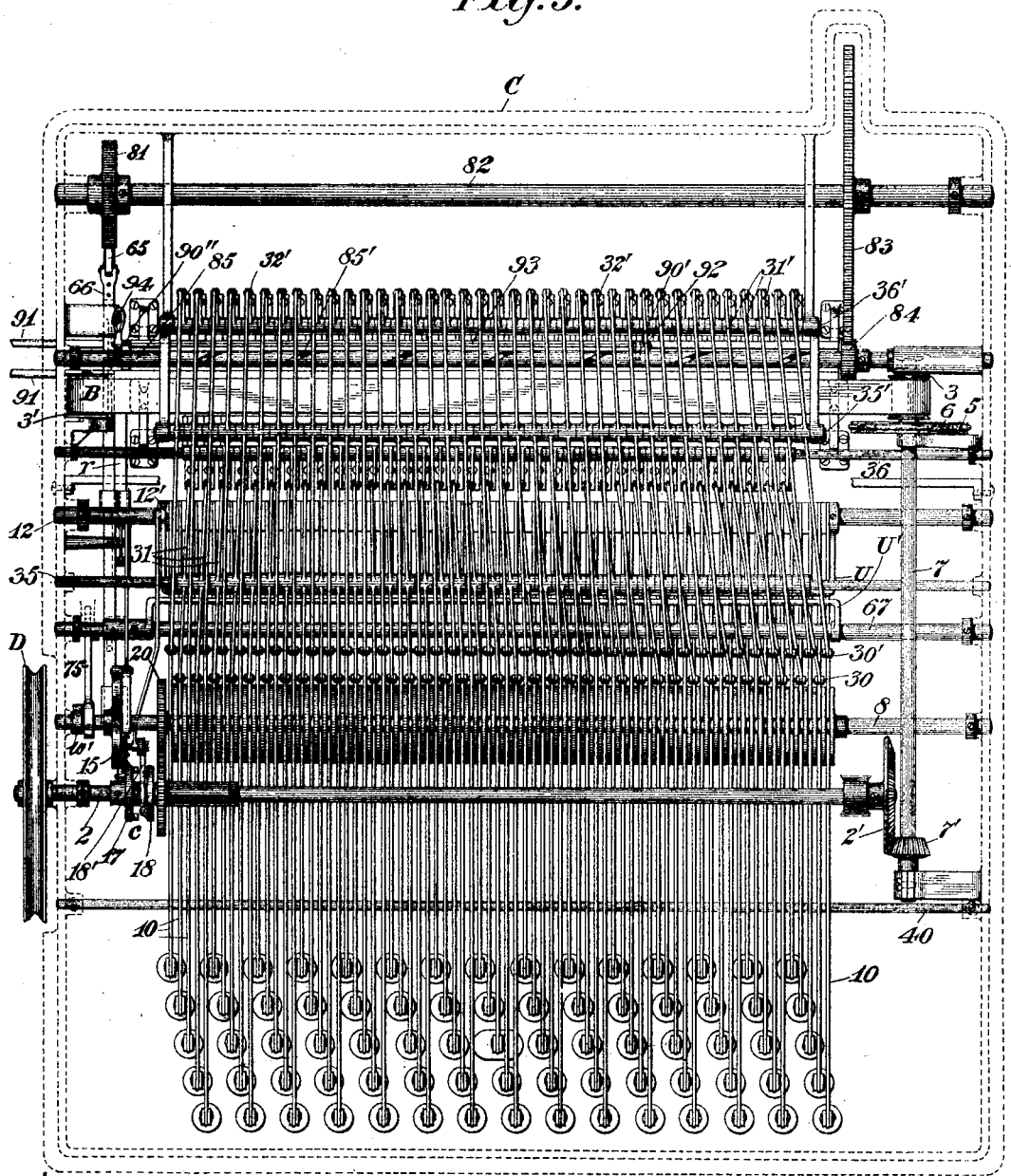
Figure 18:
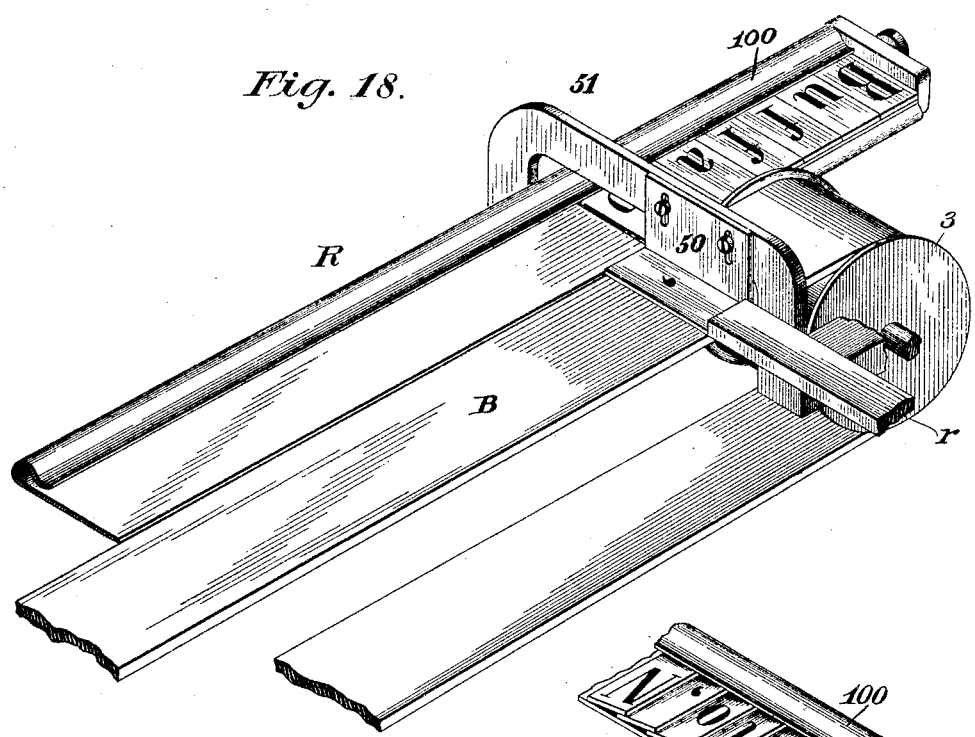
Figure 22:
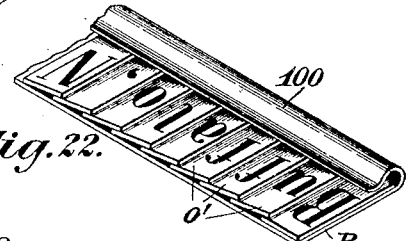
Figure 19:
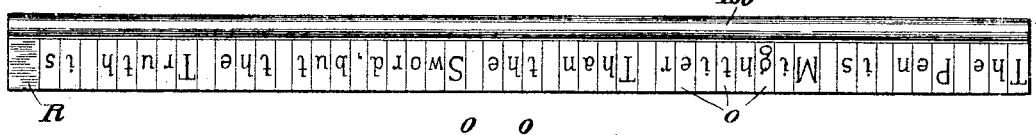
Figure 20:
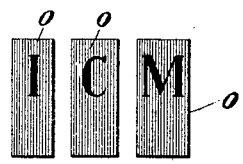
Figure 21:
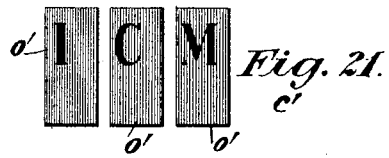

Figure 1 is a plan view of an object-setting or card-setting mechanism embodying this invention, portions of the framework being broken away in order to illustrate the construction clearly. Fig. 2 is a longitudinal section of the same, the section being taken in line 2 2, Fig. 1. Fig. 3 is an under side view of the mechanism. Fig. 4 is an enlarged substantially central longitudinal section of the major portion of the card-setting mechanism and illustrates the key-blocking means, the card-ejectors, the receiver, and the receiver-feeding mechanism. Figs. 5, 6, 7, and 8 are enlarged details illustrating successive steps in the operation of the object-shifting device and the settable member of the feed mechanism. Figs. 9 to 12, inclusive, are enlarged details illustrating successive steps in the operation of this settable member of the feed mechanism and a feed-actuator carried and operated by the object-shifting device and shiftable out of its working position by suitable operating connections from the main driving mechanism. Figs. 13 and 14 are enlarged sectional details illustrating the manner in which the cards are ejected from the magazines. Fig. 15 is a perspective view illustrating the construction of the lower portion of a series of magazines disassembled. Fig. 16 is a cross-sectional detail illustrating the manner in which the card-ejecting slides coöperate with the card-supporting ribs of the magazines. Fig. 17 is a perspective view illustrating the connections between the object-assembling receiver and the feed-screw therefor. Fig. 18 is an enlarged perspective detail illustrating the manner in which the cards are brought up to the stop by the transfer-belt and then shifted into the composing-stick or receiver by the object-shifting device. Fig. 19 is a detail of the object-assembling receiver or composing-stick filled. Fig. 20 is a detail illustrating different character-cards on an enlarged scale. Fig. 21 is a similar view illustrating a modification of the same character-cards; and Fig. 22 is a detail of a portion of the composing-stick, showing a modification of the manner in which the cards may be assembled, in this case the cards shown in Fig. 21 being assembled overlapping, whereas in Fig. 18 the cards shown in Fig. 20 are assembled so as to abut at their side edges.

Similar characters designate like parts in all the figures of the drawings.

The several operative parts of the card-setting mechanism shown in the drawings may be supported by any suitable framework—such, for example, as that indicated at C.

Although the machine shown in this application is a key-operated mechanism the keys of the selecting mechanism do not constitute the sole means for imparting movement to the several operated parts, but instead control suitable power mechanism by means of which the principal operations are effected directly. Usually the power mechanism will embody a continuously-rotative driver which may be driven in any suitable manner from a source of power. In the present construction I have shown at 2 a continuously-rotative driver suitably supported in bearings on the framework and carrying a driving wheel or pulley D, around which a belt $d$ may pass for operating the same. This shaft 2 will be connected usually with the object-transferring means by direct connections. In this case the transferring means employed is a transfer-belt, such as B, which may pass around suitable pulleys or other rotary members, such as 3 and 3', properly supported near opposite sides of the machine, the pulley 3 being in this case carried by a short shaft journaled in bearings at the left-hand side of the machine near the rear of the latter and having secured thereto a pulley 4, (see Fig. 4,) connected by a driving-belt 5 with a pulley 6, secured to the rear end of a shaft 7, journaled in bearings at the left-hand side of the machine and having in this case a pinion 7' at its forward end meshing with a bevel-gear 2' on the main driving-shaft 2. For the purpose of transmitting the movements of this continuously-rotative driver to the several operated devices of the mechanism I prefer to make use of an intermittently-rotative actuator coöperating with suitable coupling means for coupling such actuator and driver intermittently as the keys are operated, the preferred construction being that in which the actuator after being coupled makes one complete rotation and is uncoupled from the driver in time to stop moving on the completion of such cycle of movement. In the construction illustrated the intermittently-rotative actuator may be a shaft, such as 8, extending completely across the machine and journaled in suitable bearings so located that the axis of this actuator will be parallel with that of the shaft 2. Said actuator may carry any suitable cams or other means for transmitting its intermittent rotations to the several parts to be operated thereby.

The keyboard of the machine may be of any suitable type and may comprise any desired number of keys or key-levers, they corresponding in number in this case to the number of magazines containing cards. These key-levers are designated in a general way by 10, and one of them may be a space-key, this space-key controlling the selection of blank cards contained in one of the magazines and corresponding substantially to the quads or other space timber employed in hand composition and in type-setting or other analogous machines. The key-levers 10 may be of any suitable type and may be mounted in any desired way—as, for example, on a rod or rock-shaft 12, extending across the machine and having secured thereto a universal bar U, the key-levers being loosely supported on such rock-shaft. The key-levers should be reactive to their normal positions for actuation, and I have illustrated a spring $u$, in connection with the universal bar U and the usual spring 13, for returning said keys to such normal positions. As the intermittently-rotative actuator 8 should be coupled to the main driving-shaft 2 on each depression of a key, the universal bar U constitutes a convenient means for controlling the coupling device, and in the construction shown the rock-shaft 12 has secured thereto a rock-arm 12', which by means of suitable connections governs the operation of such coupling means. In this case a link 14 connects the rock-arm 12' with another rock-arm 15, supported in this instance on a stud 16 at the right-hand side of the machine. (See Figs. 1 and 2.) The rock-arm 15 controls in this instance the operation of a single-rotation clutch of a well-known type, (designated in a general way by $c$.) Here the fixed member of the clutch is indicated by 17 and has the usual pins projecting therefrom, while the loose member is designated by 18 and carries a hinged spring-pressed clutch-arm 18', normally held out of contact with the pins on the clutch member 17 by the clutch-controlling rock-arm 15, one of these coöperating parts having a suitably-shaped cam-face for assuring the release of the clutch-arm from the clutch member 17 when a previously-actuated key is released. It will be seen that when one of the character-keys is depressed the upper end of the rock-arm 15 will be oscillated toward the rear of the machine out of the path of the clutch-arm, and the latter will be shifted by its spring into position to couple the members 17 and 18 momentarily. The rotation of the clutch member 18 may be transmitted to the rotary actuator or shaft 8 by means of a pair of gears 19 and 20.

As before stated, in the construction illustrated herein the magazines are disposed in two rows, one at each side of the transfer-belt B, and each of these magazines should be of a size sufficient to contain a large number of cards. All of these magazines are substantially identical in construction, except that the magazines of different rows face in opposite directions toward the belt, the magazines in such respective rows being designated by $m$ and $m'$. A description of one of these magazines will suffice for all.

Referring now more particularly to Fig. 4 and to Figs. 13 to 16, inclusive, while these views illustrate the present preferred construction yet it should be understood that magazines of many types other than that illustrated herein might be used and that the manner in which the objects or cards are fed might also be varied. In this case, however, each of the magazines is a substantially rectangular or box-like compartment open at both ends and in position substantially vertically in order that the cards may be fed toward the bottom of the magazine by gravity and selected and removed from the under side of the pile. Each series of boxes may be formed to advantage in two parts, as illustrated clearly in Fig. 15, from which it will be seen that three sides and the bottom portions of all of the boxes may be cast in one piece and the inner sides of all of the magazines of the series closed by a common wall 25, the two main members of the series having coacting rivets and holes for connecting the parts. It will be noticed that each of the magazines has a substantially open bottom, except for a couple of inwardly-projecting ribs 26 and 26', which are intended to support the objects or cards. These card-supporting ribs extend beyond the common wall 25' of the series of magazines, and the partitions 27 may be correspondingly extended as low guides 27', the ribs 26, 26', and 27' constituting guides for a card-ejecting member.

For the purpose of holding a card in its proper position parallel with the receiving-run of the belt B while said card is being ejected from its magazine I prefer to employ suitable card guiding and holding means for engaging a card firmly until it is over the belt and in position to be released. The means shown in the present case for this purpose are two opposed card-guides, at least one of which should be a yielding member. The upper guide for each magazine will usually be a resilient tongue, such as 25", struck up from the edge of the plate 25, while the lower guide may be a very resilient spring and will be secured, preferably, to the under side of the bottom of the magazine, one of these yielding guides being shown at each side of the bottom of the magazine in position to coöperate with a corresponding tongue 25", these springs being indicated by 28. By referring to Figs. 13 and 14 it will be seen that the width of the delivery-opening between the members 25" and 28 is less than the thickness of a card $c'$ and is in the plane of the underneath card of the pile sustained by the ribs 26 and 26'. Hence when the underneath card of such pile is forced out by the proper card-ejector said card will not only be held in a horizontal position by the pressure of the superimposed cards, but will also be sustained at its rear end in such horizontal position by the card-guides 25" and 28 after it shall have been forced beyond the pile of cards by the ejector, as illustrated in Fig. 14.

Any suitable means may be employed for selecting cards one at a time from the under sides of the piles in the respective magazines; but I prefer to employ card-ejectors in the form of slides reciprocatory on the ejector-guiding ribs 26 and 26'. In the preferred construction these ribs form guide-tongues, which enter corresponding grooves in the opposite sides of a card-ejecting slide, such as $s$ or $s'$, and thereby locate the slide positively in a vertical direction throughout the movement of the latter. Obviously the upper face of each slide should extend to a height no greater than that of the upper face of the lower card in the magazine in order that the cards may be ejected one at a time, it being understood, of course, that each one of the card-magazines will have the rear wall 25' thereof cut away, as at 25''', for a distance sufficient to permit the proper operation of the card-ejector. It will be seen, therefore, that this card-ejector is movable transversely to and through the magazine and across the mouth or bottom thereof when it is operated to project a card from a magazine. Moreover, the card-guides 25" and 28 not only have their card-gripping faces substantially parallel with the receiving-run of the belt B, but also have their delivery ends over and close to such belt in order that the card may not fall so far as to be liable to be improperly positioned.

The card-ejectors $s$ and $s'$ may be operated directly from the key-levers 10 of the keyboard, suitable connections from such key-levers being employed for this purpose. The connections to the slides $s$, corresponding to the magazines $m$, are in this case a link 30, a straight lever 31, and an angle-lever 32, while the connections to the slides $s'$, corresponding to the magazines $m'$, in thir instance will be a link 30', a straight lever 31', a link 33, and an angle-lever 32'.

The several sets of levers 31, 31', 32, and 32' may be loosely mounted on rods, such as 35, 35', 36, and 36', as shown clearly in Figs. 2, 3, and 4, these rods being carried by suitably-positioned supports on the framework.

The manner in which the several cards are selected and the pile of cards in each magazine fed to bring another card into position after one has been removed may be varied, as it is only necessary that some means be provided for feeding the cards of each pile and for selecting the desired cards by the manipulation of suitable selecting means.

In order to prevent improper operation of the keys and to avoid interference in the timing of the movements of the parts, I prefer, as before stated, to make use of suitable blocking means for assuring the regular fingering of the keys. The rotary blocking means hereinbefore referred to may be carried advantageously by the intermittently-rotative actuator or shaft 8, hereinbefore mentioned, and hence the key-blocking means will be intermittently rotative. Of course in the construction shown the coupling of the clutch members 17 and 18 will control the rotation of all of the key-blocking devices, all of these being carried, preferably, in corresponding positions about the axis of the shaft 8. In the construction illustrated these blocking devices are a series of disks fixed to the shaft 8, there being one disk for each of the keys shown, and as all of these blocking devices are substantially identical in construction a description of but one of them will suffice for all.

Referring particularly to Fig. 4, it will be seen that the disk $b$ coöperates with a member, such as the pin 10' on the key-lever 10. This pin is so located that when the key-lever is in its uppermost position—determined by a suitable stop, such as the stop-rod 40—the periphery 41 of the disk $b$ will be close to and under said pin. This periphery constitutes the descent-blocking face of the disk, and the latter will also have an ascent-blocking face, such as the wall 42' of the blocking-groove 42, this blocking-groove and its blocking-face being concentric throughout the major portion of their lengths with the periphery of the disk, but opening into the periphery of the disk at one point, so as to permit the depression of a key and the descent of the pin 10' thereof into the groove 42 in the side of such disk. Obviously when all of the keys are in their normal positions the openings of all of the grooves 42 should be just below the series of pins 10'. As soon as a key is depressed the clutch members 17 and 18 will be coupled, and thereupon the shaft 8 will be rotated through a single cycle, during which time of course it will be impossible for any other key-lever to be actuated, owing to the fact that their pins 10' are in contact with the peripheries of the disks $b$. As soon as a key has moved from the upper to the lower position in Fig. 4 the disk will begin to rotate, and thereupon the pin 10' of the depressed key will enter the circular portion of the groove 42 and be held down by the blocking-face 42' until the disk shall have made one complete rotation, when, of course, the key-lever will be returned to its normal position by the spring 13, whereupon another key may be depressed on the stoppage of the rotation of the shaft 8. It will be apparent, therefore, that the two blocking-faces 41 and 42' are alternately effective, the former to prevent the improper actuation of a key after another one has been depressed, while the curved face 42' constitutes an ascent-blocking face for preventing the premature return of the depressed key-lever to its normal position.

In order to check the rotation of the intermittently-effective blocking means quickly at the end of each complete cycle of rotation, I prefer to employ, in connection with the pin 10', a key-striking or pin-striking stop-face, such as the radial stop-face 45, connecting the blocking-faces 41 and 42'. It will be seen that during the last part of each rotation of a blocking-disk the corresponding pin 10' will run out of the straight portion 42'' of the groove 42, and when said pin comes opposite the face 45 the latter will strike the pin, and its rotation will be immediately checked. This stoppage of the movement of the blocking-disk will of course not take place until the clutch members shall have been uncoupled.

Each of the objects or cards as it is ejected from its magazine will drop onto the continuously-running belt B and will be carried by the latter to a predetermined point, where the card will strike against a suitable stop, such as 50, carried in this case by an arched support, such as 51, overhanging the belt and forming part of the framework. As soon as the card reaches this stop it should be removed from the belt in some suitable manner—for example, by a reciprocatory object-shifting device, such as $r$, preferably movable in a path transverse to that of the upper run of the belt B. This shifting device will slide in suitable ways in guides, such as 55 and 56, carried at the upper right-hand side of the framework, as shown in Figs. 1 and 2, and may be controlled by connections from the intermittently-rotative actuator or shaft 8. This object-shifting device will derive its return stroke usually from such shaft and will be spring-pressed to strike the card, a suitable spring 57 being employed for this purpose. The cam which is employed in this case to impart the return stroke to the shifting device is indicated by $w$ and has a quick-let-off face 58, permitting the device to be forced quickly into contact with the card when the spring is released, while a somewhat gradually rising cam-face 58' controls the return stroke of the slide $r$. In the construction illustrated the connections between this slide and cam comprise a lever 60, connected with the slide, and a link 61, connected with the lever 60 and having a forked end 61', guided by the shaft 8, this forked end of the link carrying a suitable pin or antifriction-roll, such as 61'', coöperative with the periphery of the cam-wheel $w$.

The card-setting mechanism illustrated in the drawings is especially designed and intended as a means for setting up selectively cards bearing characters requiring different spacing in the lines in which they may be assembled, and in the preferred construction (shown in detail in Figs. 20, 18, and 19) the cards themselves are of different widths, these widths corresponding to the spaces needed for the respective characters when set up in a line of matter. In these cards, which are designated by $o$, the characters are disposed centrally between the side edges of the card, and said side edges abut when the cards are assembled in the receiver or composing-stick.

In the modification shown in Figs. 20 and 21 the cards o' may all be of the same width, and their characters are located nearer to the right-hand edges of the cards than to the left-hand edges thereof, and when assembled in the receiver the cards overlap, as shown in Fig. 21.

In using cards of the type shown in the principal views (shown in Figs. 18, 19, and 20) the separate cards are delivered from the belt B onto a card-assembling receiver or composing-stick, preferably movable step by step and having variable feed movements corresponding to the widths of the characters selected by the operation of the individual keys of the keyboard. As this variable spacing of the letters composing a line of matter is at the present time absolutely necessary for nearly all forms of book, newspaper, and other work, a variable feed mechanism controlled by the keys of the keyboard and operative for imparting corresponding variable feed movements to the receiver or composing-stick is one of the most important features of this invention. A variable feed mechanism of any suitable kind may be employed, and I have illustrated herein a simple type of mechanism operative in this manner. It may embrace as its essential feature a feed member or feed-controlling pawl having different ranges of movement controlled by different keys and adapted to impart to the remainder of the feed mechanism differential feed movements of the extent determined by the selection of the keys. This feed-pawl, which is indicated herein by 65, may be a spring-pressed one pivoted to a slide carried in the ways of suitable guides, two of which may be the guides 55 and 56 hereinbefore referred to. This slide is designated by 66 and may have a projection or finger 66' in position to coöperate with a member controlled by a key-lever on the keyboard.

The operative connections between the key-levers and the slide 66 may be of any suitable type; but I prefer to employ in connection with the key-levers a universal bar operated by fingers of different lengths projecting from said key-levers, the lengths of these fingers determining the extent to which the slide 66 will be reciprocated, and hence the extent of feed of the variable-feed mechanism and the receiver or composing-stick. This universal bar is designated herein by U' and may be mounted loosely on a rod 67, extending transversely across the machine, and said universal bar may also operate a rock-arm 68, coacting with the finger 66'. The variable lengths of the fingers of the key-levers are clearly shown in Fig. 2, in which one of said fingers is indicated at 10''. It will be observed that when any of the keys is actuated the rock-arm 68 will shift the slide 66 and the pawl 65 toward the rear of the machine a distance indicated by the depression of a key, it being apparent from Fig. 4 that while the stop 40 determines the upper limit of the movements of the key-levers the wall 42''' also limits positively the downward movements of the key-levers, it being apparent that each key-lever when it is actuated moves through the same arc and that the length of the arc of oscillation of the universal bar U' is determined entirely by the fingers 10''. After the feed-pawl 65 has been set in the manner just described it will be operated at the proper time to transmit a feed movement to the remainder of the feed mechanism, and this working stroke of the feed-pawl will be imparted preferably by a feed actuator or member carried by the object-shifting device when the latter is drawn back by its spring 57. In the construction this member on the object-shifting device or slide r is a swinging pawl 70, supported for oscillation in the vertical plane of the feed-slide 66, and the latter has thereon a stop-face preferably curved, as shown at 66'', (see Figs. 5, 7, and 8,) to correspond to the curved working end of the feed-actuating pawl 70. When the slide r is shifted through the successive stages of its movement, which are shown in Figs. 6, 7, and 8, the slide 66 is carried with it and the feed-pawl 65 imparts the determined feed movement to the remainder of the feed mechanism.

In order that the feed-actuating pawl 70 may not interfere with the setting of the feed-pawl 65, said pawl 70 may be a feed-actuator of the "by-pass" type and may be shifted out of the path of the stop-face 66'' during the last portion of the return movement of the slide r—that is, during the movement of said slide from the position shown in Fig. 8 to that illustrated in Fig. 5. For this purpose I make use of a pawl-shifting device, such as a shifting-rod 75, guided at its upper end in a guideway 80 in the framework, and having at its lower end a forked arm guided by the shaft 8. This shifting-rod may carry a pawl-shifting pin, such as 75', and may also have a pin or antifriction-roll 75'', coöperative with a cam or wiper w' on the shaft 8. (See Figs. 9 to 12, inclusive.) This shifting of the pawl 70 out of the path of the stop-face 66'' will be effected during the movement of the wiper w' from the position shown in Fig. 12 to that indicated in Fig. 9.

For the purpose of transmitting the determined feed movement of the pawl 65 to the receiver I have illustrated herein a ratchet-wheel 81, coöperative with said pawl and having relatively fine ratchet-teeth. In the present construction this ratchet-wheel is secured to a shaft 82, extending across the machine, at the rear of the latter, and carrying at its left-hand end (see Figs. 1 and 2) a large gear 83, in mesh with a small pinion 84, secured to a feed-screw 85, parallel with the shaft 82 and journaled at its ends in suitable bearings in the framework. From this feed-screw the feed movement of the mechanism is intended in this case to be transmitted directly to the card-assembling receiver or composing-stick. This receiver is located advantageously with its receiving edge in close proximity to the card-discharging edge of the upper run of the belt B, and the preferred type of receiver or composing-stick is shown herein at R, Figs. 4 and 18. In order to hold the cards firmly in place in their assembled positions, this composing-stick should have suitable object-gripping means, and preferably is constructed in such a manner as to have along one edge a resilient object-holding clip, under which one end of each card may be pushed by the object-shifting slide r, the latter having a stroke of sufficient length for this purpose. The step-by-step variable feed movements of this receiver will be derived, as before stated, directly from the feed-screw 85, said receiver being secured in this instance to a traveling carriage 90, supported to slide in guides such as 91. (See Figs. 1 and 4.) This carriage has arms 90' and 90" depending therefrom, the former coacting with the feed-screw 85, it being connected therewith preferably by means of a shiftable releasing device of the type indicated in Figs. 3, 4, and 17. Here a swinging finger 92, shiftable into and out of the groove 85' in the feed-screw, is secured to a rod 93, supported by the arms 90' and 90" and having at one end a short releasing-lever 94, this releasing device as a whole being carried by and moving with the carriage 90 and being spring-returned to its normal working position, a coiled spring for this purpose being shown at 95.

The operation of a card-setting mechanism constructed in accordance with my invention, as hereinbefore described, is as follows: It being understood that the band-wheel D is continuously rotated by the belt d, it will be seen that through the driving mechanism thereto a continuous traveling movement will be imparted to the transfer-belt B. On the depression of any key shown on the keyboard the universal bar U' will be operated by one of the fingers 10", and the rock-arm 68 will push the slide 66 and with it the feed-pawl 65 toward the rear of the machine a distance corresponding to the feed movement indicated by such finger 10" on the selected key-lever, thus setting the feed-pawl for the determined movement of the feed mechanism. At the same time that the universal bar U' is operated the slide s or s', as the case may be, which corresponds to the key-lever just actuated will be shifted across the mouth of its card-magazine and toward the receiving run of the belt B and will force the lowermost card of such magazine out from the pile and into the space just above the upper run of the belt B, whence it will drop onto the latter and be carried along until it reaches the stop 50. At the same time that the feed-pawl and the card-ejecting slide are being operated the universal bar U is oscillated by the same key-lever, and through the connections thereto the rock-arm 15 is shifted toward the rear of the machine and out of the path of the end of the clutch-arm 18', whereupon the latter is forced by its spring into the path of one of the pins of the clutch member 17, and thereupon, the clutch members being coupled, the movement of the shaft 2 is imparted momentarily to the rotary actuator or shaft 8. Just before this shaft starts rotating, however, the pin 10' on the key-lever just operated will enter the groove 42 in its blocking-face, (see Fig. 4,) and as soon as such rotation begins all of the unoperated key-levers will be blocked by the peripheries of their respective blocking-disks, and the rising of the operated key-lever will be prevented by the blocking-face 42' until a complete rotation of the shaft 8 shall have been made. When the shaft 8 has completed about three-fourths of a rotation, the roll 61" will be released by the let-off face 58 of the cam w, and the spring 57, reacting, will operate the object-shifting device r quickly, which will strike the card resting on the upper run of the belt B against the stop 50, and thereby drive the card onto the receiver R and under the edge of the clip 100, the slide r being returned to its original position by the cam-face 58' during the last quarter of the rotation of the cam w. (See Figs. 6, 7, and 8.) During the last portion of the rotation of this cam the pawl 70 will engage the stop-face 66" on the slide-rod 66, carrying the feed-pawl 65, and will positively shift said slide and feed-pawl, and thereby impart the determined feed movement to the remainder of the feed mechanism and to the receiver R, which will be shifted by the feed-screw a distance corresponding to the width of the card just selected. During the last moment of this return movement of the object-shifting device r the pawl 70 will be shifted out of the way of the stop-face 66" by the pin 75' on the shifting rod or bar 75, the movement being from the position indicated in Fig. 12 to that shown in Fig. 9. Shortly before the completion of one rotation of the shaft 8 the coupling member 18' comes into contact with the coöperative face of the rock-arm 15 and is shifted back to its normal position out of the path of the pins on the clutch member 17, and thereupon the shaft 8 is uncoupled from the driving-shaft 2. The momentum of said shaft 8 will be sufficient to carry it through the last portion of its rotation, and it will continue to move until the pin 10' on the operated key-lever rides out of the straight portion 42" of the groove 42 in the corresponding blocking device and into the path of the stop-face 45, when the latter will strike said pin, and thus immediately check the rotation of the shaft 8, the pin 10' rising out of said groove, and thus clearing all of the keys to permit the operation of another key and the commencement of another cycle of operation. By continuing to strike the keys in proper order any desired matter may be composed in the receiver R until the latter is full or any other predetermined amount of matter has been set up therein.

If at any time a mistake is made in fingering the keys or if it should be found necessary to shift the composing-stick for any other reason, the releasing-lever 94 may be depressed and the receiver shifted to any desired point in the line, the finger 92 being entered in the groove 85' by turning the spur-gear 83 until said finger slips into the groove. When a mistake is made and the composing-stick is thus shifted back, the cards may be removed to the point where the mistake was made and the latter then reset by properly manipulating the keys.

A line of cards set up in the manner just described constitutes, for the purpose of reproduction, a substitute for a line of mechanically-composed types or a linotype and when so composed may be photographed or photoprinted and the cards afterward distributed to their respective magazines.

Having described my invention, I claim—

1. The combination, with card-magazines, of a plurality of sets of cards, one set for each magazine, each card having on one of its two major faces a character suitable for reproduction by photoprinting; card-selecting means; and a card-assembling receiver for receiving and assembling said cards with their character-surfaces facing outward.

2. The combination, with card-magazines, of a plurality of sets of cards, one set for each magazine, each card having on one of its major faces a character suitable for reproduction by photoprinting; card-selecting means; movable card-transferring means; and a card-assembling receiver coöperative with said card-transferring means for receiving and assembling said cards with their character-surfaces facing outward.

3. The combination, with card-magazines, of a plurality of sets of cards, one set for each magazine, each card having on one of its major faces a character suitable for reproduction by photoprinting; card-selecting means; a card-transferring belt; means for continuously advancing said belt; and a card-assembling receiver coöperative with said belt for receiving and assembling said cards with their character-surfaces facing outward.

4. The combination, with card-magazines, of a plurality of sets of cards, one set for each magazine, each card having on one of its major faces a character suitable for reproduction by photoprinting; card-selecting means; separately-operative card-transferring and card-shifting devices; and a card-assembling receiver coöperative with said card-shifting device for receiving and assembling said cards with their character-surfaces facing outward.

5. The combination, with card-magazines, of a plurality of sets of cards, one set for each magazine, each card having on one of its major faces a character suitable for reproduction by photoprinting; card-selecting means; separately-operative card-transferring and card-shifting devices movable transversely to each other; and a card-assembling receiver coöperative with said card-shifting device for receiving and assembling said cards with their character-surfaces facing outward.

6. The combination, with card-magazines, of a plurality of sets of cards, one set for each magazine, each card having on one of its major faces a character suitable for reproduction by photoprinting; a card-transferring belt; a card-shifting device; and a card-assembling receiver coöperative with said shifting device for receiving and assembling said cards with their character-surfaces facing outward.

7. The combination, with card-magazines, of a plurality of sets of cards, one set for each magazine, each card having on one of its major faces a character suitable for reproduction by photoprinting; card-selecting means; movable card-transferring means; and a movable card-assembling receiver coöperative with said card-transferring means for receiving and assembling said cards with their character-surfaces facing outward.

8. The combination, with card-magazines, of a plurality of sets of cards, one set for each magazine, each card having on one of its major faces a character suitable for reproduction by photoprinting; card-selecting means; a movable card-assembling receiver for receiving and assembling said cards with their character-surfaces facing outward; and receiver-feeding means.

9. The combination, with card-magazines, of a plurality of sets of cards, one set for each magazine, each card having on one of its major faces a character suitable for reproduction by photoprinting; card-selecting means; card-transferring means; a movable card-assembling receiver coöperative with said transferring means for receiving and assembling said cards with their character-surfaces facing outward; and step-by-step receiver-feeding means.

10. The combination, with object-magazines, of object-selecting means; object-transferring means; a movable object-assembling receiver; a continuously-rotative driver; an intermittently-rotative driven member operative by said driver and controlled by said object-selecting means; and power-operated receiver-feeding means controlled by said driven member and operative for feeding the receiver with its assembled objects.

11. The combination, with object-magazines, of object-selecting means; object-transferring means; a movable object-assembling receiver; a continuously-rotative driver; an intermittently-rotative driven member operative by said driver and controlled by said object-selecting means; and power-operated variable-feed receiver-feeding means controlled by said driven member and operative for feeding the receiver with its assembled objects.

12. The combination, with object-magazines, of key-operative object-selecting means;

object-transferring means; a movable object-assembling receiver; a continuously-rotative driver; an intermittently-rotative driven member operative by said driver and controlled by said object-selecting means; and power-operated receiver-feeding means controlled by said driven member and operative for feeding the receiver with its assembled objects.

13. In a key-operated mechanism, the combination, with a plurality of wide objects each having on one of its faces a relatively narrow character as compared with the width of such face, the characters of different objects being of different widths, of object-selecting means; an object-assembling receiver; and variable-feed receiver-feeding means for feeding said receiver distances proportionate to the widths of the characters on the selected objects.

14. The combination, with a plurality of cards each having on one of its major faces a character, of card selecting and setting means for setting selected cards with their side edges overlapping and their characters facing outward.

15. The combination, with a plurality of cards each having on one of its major faces a character, and each also having a blank portion at one side of such character, of card selecting and setting means for setting selected cards with such blank portions overlapping and with the characters facing outward.

16. The combination, with a plurality of cards each having on one of its major faces a character proximate to one side edge and remote from the other side edge of such face to leave a blank space at one side of the character, of object selecting and setting means for setting selected cards with the proximate edges overlapping the remote edges of successive cards and with their characters facing outward.

17. The combination, with a plurality of cards each having on one of its major faces a character proximate to one side edge and remote from the other side edge of such face to leave a blank space at one side of the character, of object selecting and setting means for setting selected cards with the proximate edges of succeeding cards overlapping the remote edges of preceding cards and with their characters facing outward.

18. The combination, with a plurality of cards each having on one of its major faces a character relatively narrow as compared with the width of such card, the characters of different cards being of different widths, of card selecting and setting means for setting selected cards with their side edges overlapping; and variable feed mechanism for feeding selected cards distances proportionate to the widths of the characters on such cards.

19. The combination, with object-magazines, of object-selecting means; an object-transferring belt; a stop in the path of objects traveling on said belt; an object-shifting device for pushing the objects off from said belts; and a movable object-assembling receiver.

20. The combination, with object-magazines, of key-operating object-selecting means; an object-transferring belt; a stop in the path of objects traveling on said belt; an object-shifting device controlled by said keys; and a movable object-assembling receiver.

21. The combination, with object-magazines, of key-operated object-selecting means; object-transferring means; an object-shifting device controlled by said keys; a movable object-assembling receiver; and receiver-feeding means also controlled by said keys.

22. The combination, with object-magazines, of a plurality of wide objects each having on one of its faces a relatively narrow character as compared with the width of such face, the characters of different objects being of different widths; key-operated object-selecting means; and variable feed mechanism operative for shifting said objects and having differential feed movements controlled, respectively, by different object-selecting keys and proportionate to the widths of the characters selected by such keys.

23. The combination, with object-magazines, of a plurality of wide objects each having on one of its faces a relatively narrow character as compared with the width of such face, the characters of different objects being of different widths; key-operated object-selecting means embodying a variable-movement universal bar shiftable in paths of different lengths by different keys; and variable feed mechanism operative for shifting said objects, and having differential feed movements controlled by said universal bar and proportionate to the widths of the characters selected by the keys.

24. The combination, with object-magazines, of a plurality of wide objects each having on one of its faces a relatively narrow character as compared with the width of such face, the characters of different objects being of different widths; key-operated object-selecting means embodying a variable-movement universal bar shiftable in paths of different lengths by different keys; and variable feed mechanism operative for shifting said objects and embodying a variable-movement feed-pawl the movements of which are proportional to the widths of the characters selected by the keys and are controlled by said universal bar.

25. The combination, with object-magazines, of a plurality of wide objects each having on one of its faces a relatively narrow character as compared with the width of such face, the characters of different objects being of different widths; key-operated object-selecting means embodying a variable-movement universal bar shiftable in paths of different lengths by different keys; and variable feed mechanism operative for shifting said objects and embodying a variable-movement feed-pawl controlled by said universal bar, and settable on the actuation of a key and operative for actuating the remainder of the feed mechanism on the release of such key, the movements of said feed-pawl being proportional to the widths of the characters selected by the keys.

26. The combination, with object-magazines, of key-operated object-selecting means; movable object-transferring means; a movable object-assembling receiver; a continuously-rotative driver; an intermittently-rotative driven member operative by said driver and controlled by said object-selecting means; and power-operated variable-feed receiver-feeding means operative by said driven member and having differential feed movements controlled, respectively, by different object-selecting keys and operative for feeding the receiver with its assembled objects.

27. The combination, with object-magazines, of key-operated object-selecting means; movable object-transferring means; a movable object-assembling receiver; and power-operated variable-feed receiver-feeding means embodying an intermittently-rotative feed-screw having differential feed movements controlled, respectively, by different object-selecting keys and operative for feeding the assembled objects.

28. The combination, with object-magazines, of key-operated object-selecting means; an object-transferring belt; a stop in the path of objects traveling on said belt; an object-shifting device; a continuously-rotative driver; an intermittently-rotative actuator controlling the operation of said object-shifting device; coupling means between said driver and actuator and controlled by the actuation of said keys; and an object-assembling receiver.

29. The combination, with object-magazines, of key-operated object-selecting means; an object-transferring belt; a stop in the path of objects traveling on said belt; a continuously-rotative driver; an intermittently-rotative actuator controlling the actuation of the object-shifting device; coupling means between said driver and actuator and controlled by the actuation of said keys; an object-shifting device operative by said actuator; and feed mechanism operative by said object-shifting device.

30. The combination, with object-magazines, of key-operated object-selecting means; object-transferring means; a stop in the path of objects moving with said transferring means; an object-shifting device; and feed mechanism operative by said object-shifting device.

31. The combination, with object-magazines, of key-operated object-selecting means; object-transferring means; a stop in the path of objects moving with said transferring means; an object-shifting device; a by-pass feed-actuator carried by said object-shifting device; and feed mechanism operative by said feed-actuator.

32. The combination, with card-magazines, of a plurality of sets of cards, one set for each magazine, each card having on one of its major faces a character suitable for reproduction by photoprinting; key-operated card-selecting means; card-transferring means; a stop in the path of cards moving with said transferring means; a spring-pressed card-shifting device; driving mechanism for actuating said card-shifting device; and a card-assembling receiver coöperative with said card-shifting device for receiving and assembling said cards with their character-surfaces facing outward.

33. The combination, with object-magazines, of key-operated object-selecting means; object-transferring means; a stop in the path of objects moving with said transferring means; a spring-pressed object-shifting device; driving mechanism for actuating said object-shifting device; feed mechanism operative by the object-shifting device on the return stroke of the latter; and an object-assembling receiver.

34. The combination, with object-magazines, of key-operated object-selecting means; object-transferring means; a stop in the path of objects moving with said transferring means; a spring-pressed object-shifting device; driving mechanism for actuating said object-shifting device; a feed-actuating pawl carried by said object-shifting device; feed mechanism operative by said pawl on the return stroke of the object-shifting device; and an object-assembling receiver.

35. The combination, with object-magazines, of the following operative instrumentalities successively effective in the order named—viz., key-operated object-selecting means; object-transferring means; an object-shifting device; and feed mechanism operative by the object-shifting device.

36. The combination, with object-magazines, of the following operative instrumentalities successively effective in the order named—viz., key-operated object-selecting means; object-transferring means; an object-shifting device; and feed mechanism settable by said keys and operative by the object-shifting device.

37. The combination, with card-magazines, of a plurality of sets of cards, one set for each magazine, each card having on one of its major faces a character suitable for reproduction by photoprinting; key-operated card-ejectors; card-transferring means; and a card-assembling receiver for receiving and assembling said cards with their character-surfaces facing outward.

38. The combination, with card-magazines, of a plurality of sets of cards, one set for each magazine, each card having on one of its major faces a character suitable for reproduction by photoprinting; key-operated card-ejecting slides; card-transferring means; and a card-assembling receiver for receiving and assembling said cards with their character-surfaces facing outward.

39. The combination, with card-magazines, of key-operated card-ejectors; a plurality of sets of cards, one set for each magazine, each card having on one of its major faces a character suitable for reproduction by photoprinting; and a key-controlled card-assembling receiver for receiving and assembling ejected cards with their character-surfaces facing outward.

40. The combination, with a card-magazine, of a yielding card-guide coöperative therewith and fixed at one end adjacent to the delivery-point of the magazine, and a key-operated card-ejector.

41. The combination, with a card-magazine, of opposed card-guides coöperative therewith and projecting therefrom, and a key-operated card-ejector.

42. The combination, with a card-magazine, of opposed yielding card-guides coöperative therewith, and a key-operated card-ejector.

43. The combination, with a card-magazine, of a set of cards, each card having on one of its major faces a character suitable for reproduction by photoprinting; a card-guide coöperative with said card-magazine and having its discharge end over the transferring means and coöperative with said transferring means and adapted to deliver cards to the transferring means with their character-surfaces facing outward; movable card-transferring means; and a key-controlled card-ejector.

44. The combination, with a card-magazine, of a yielding card-guide coöperative therewith and having its discharge end over the transfer-belt; a card-transferring belt; and a key-operated card-ejector.

45. The combination, with a card-magazine, of a yielding card-guide coöperative therewith and having its discharge end over, and its guide-face substantially parallel with, the receiving-run of the transfer-belt; a card-transferring belt; and a key-operated card-ejector.

46. The combination, with a vertically-disposed card-magazine, of a yielding card-guide projecting therefrom and coöperative therewith and disposed transversely thereto at the bottom thereof; card-transferring means; and a key-operated card-ejector.

47. In a key-operated mechanism, the combination, with card-magazines, each having an open delivery end with card-supporting ejector-guiding ribs at the sides of such opening, of sets of cards normally supported on the faces of said ribs; key-operated card-ejectors; and means for assembling the ejected cards.

48. In a key-operated mechanism, the combination, with card-magazines each having an open delivery end with card-supporting ejector-guiding ribs at the sides of such opening, of sets of cards normally supported on the faces of said ribs; key-operated reciprocatory card-ejectors movable on said ribs transversely to and through the magazines; and means for assembling the ejected cards.

49. In a key-operated mechanism, the combination, with an object-magazine having an open delivery end, and with means for supporting all of the objects, of a set of objects for said magazine, and a key-operated object-ejector movable in the plane of the lowermost card of the set, and having its upper face no higher than that of the lowermost card.

50. The combination, with object-magazines, of key-operated object-ejectors; key-blocking means controlled by the actuation of said respective keys; object-transferring means; and an object-assembling receiver.

51. In a key-operated mechanism, the combination, with a plurality of keys, of rotary key-blocking means controlled by the actuation of said respective keys, and an operated mechanism also controlled by said keys.

52. In a key-operated mechanism, the combination, with a plurality of keys, of intermittently-rotative key-blocking means controlled by the actuation of said respective keys, and an operated mechanism also controlled by said keys.

53. In a key-operated mechanism, the combination, with a plurality of keys, of a continuously-rotative driver; intermittently-rotative key-blocking means; coupling means between the rotary driver and the key-blocking means and controlled by the actuation of said respective keys, and an operated mechanism also controlled by said keys.

54. In a key-operated mechanism, the combination, with a key, of a rotary key-blocking device having concentric blocking-faces, and an operated mechanism controlled by said key.

55. In a key-operated mechanism, the combination, with a key, of a rotary key-blocking device having alternately-effective blocking-faces, and an operated mechanism controlled by said key.

56. In a key-operated mechanism, the combination, with a key, of a rotary key-blocking device having alternately-effective concentric blocking-faces, and an operated mechanism controlled by said key.

57. In a key-operated mechanism, the combination, with a key, of a rotary key-blocking disk having a peripheral blocking-face and also having a blocking-groove in its side face opening into the periphery of the disk, and an operated mechanism controlled by said key.

58. In a key-operated mechanism, the combination, with a plurality of keys, of simultaneously-rotative key-blocking devices each having alternately-effective blocking-faces, and an operated mechanism controlled by said keys.

59. In a key-operated mechanism, the combination, with a plurality of keys, of a continuously-rotative driver; simultaneously and intermittently rotative key-blocking devices each having alternately-effective blocking-faces; coupling means between the rotary driver and the key-blocking devices and controlled by the actuation of said respective keys; and an operated mechanism also controlled by said keys.

60. In a key-operated mechanism, the combination, with a plurality of keys, of card-magazines corresponding to such keys; a plurality of sets of cards, one for each magazine, each card having on one of its major faces a character suitable for reproduction by photo-printing; key-operated card-ejectors; card-transferring means; and a card-assembling receiver for receiving and assembling said cards with their character-surfaces facing outward.

61. In a key-operated mechanism, the combination, with a rotation-stopping key, of a rotary key-blocking device having a key-striking stop-face, and an operated mechanism also controlled by said key.

62. In a key-operated mechanism, the combination, with a rotation-stopping key, of a rotary key-blocking device having alternately-effective blocking-faces and also having a key-striking stop-face between said blocking-faces, and an operated mechanism also controlled by said key.

63. In a key-operated mechanism, the combination, with a rotation-stopping key, of a rotary key-blocking device having alternately-effective concentric blocking-faces and also having key-striking stop-faces between said blocking-faces, and an operated mechanism also controlled by said key.

64. In a key-operated mechanism, the combination, with a rotation-stopping key, of a rotary key-blocking device having alternately-effective concentric blocking-faces and also having a substantially radial key-striking stop-face between and connecting said blocking-faces, and an operated mechanism also controlled by said key.

65. In a key-operated mechanism, the combination, with a reactive key having a rotation-stopping pin, of an intermittently-rotative key-blocking device having alternately-effective concentric ascent-blocking and descent-blocking faces and also having a pin-striking stop-face between said blocking-faces, and an operated mechanism also controlled by said key.

66. The combination, with object-magazines, of key-operated object-selecting means, and an object-assembling receiver having resilient object-gripping means in position and operative for gripping all of the objects received thereby.

67. The combination, with object-magazines, of key-operated object-selecting means, and an object-assembling composing-stick having a continuous resilient object-holding clip extending along one side thereof and operative for gripping all of the objects received thereby.

68. The combination, with object-magazines, of key-operated object-selecting means, and an object-assembling composing-stick having an object-holding clip substantially U-shaped in cross-section.

69. The combination, with object-magazines, of key-operated object-selecting means, and an object-assembling composing-stick having a continuous object-holding clip substantially U-shaped in cross-section and extending along one side thereof, and operative for gripping all of the objects received thereby.

70. The combination, with object-magazines, of key-operated object-selecting means; object-transferring means; a continuously-rotative driver; an intermittently-rotative driven member operative by said driver and controlled by said object-selecting means; power-operated receiver-feeding means controlled by said driven member and operative for feeding the receiver with its assembled objects; and a movable object-assembling receiver shiftably connected with said feeding means.

FRANCIS H. RICHARDS.

Witnesses:
WM. H. BLODGETT,
C. S. CHAMPION.